United States Patent [19]

Russo

[11] Patent Number: 4,614,203
[45] Date of Patent: Sep. 30, 1986

[54] LOCKABLE VALVE

[75] Inventor: Onofrio N. Russo, Middle Village, N.Y.

[73] Assignee: Gas Energy, Inc., Brooklyn, N.Y.

[21] Appl. No.: 661,118

[22] Filed: Oct. 15, 1984

[51] Int. Cl.[4] ............................................. F16K 35/06
[52] U.S. Cl. ..................................... 137/385; 251/309
[58] Field of Search ..................... 251/101, 111, 309; 137/385

[56] References Cited

U.S. PATENT DOCUMENTS

| 102,290 | 4/1870 | Maxwell | 70/176 |
|---|---|---|---|
| 359,714 | 3/1887 | Deming | 70/176 |
| 1,262,185 | 4/1918 | Drew | 70/181 |
| 1,325,189 | 12/1919 | Carter | 70/176 |
| 2,748,794 | 6/1956 | Dodds | 137/385 |
| 3,554,218 | 1/1971 | Smith | 137/385 |
| 3,560,130 | 2/1971 | Horhota | 251/111 |
| 4,126,023 | 11/1978 | Smith et al. | 137/385 |

Primary Examiner—Martin P. Schwadron
Assistant Examiner—Sheri M. Novack
Attorney, Agent, or Firm—Fitzpatrick, Cella, Harper & Scinto

[57] ABSTRACT

A rotary plug valve capable of being locked in selected positions includes a body and a valve member rotatable in the body between valve open and closed positions. Transverse bores are formed in the body and valve member for reception of a locking pin having a first enlarged head on a reduced shank and a second enlarged head capable of receiving the reduced end of the shank and of being locked thereto. The bore in the body is of a size to receive the heads, the central portion of the bore in the valve body being of a size less than the diameter of the heads but sufficient to receive the shank of the locking pin so that once locked, the pin may not be removed and the valve body and valve member may not be rotated relatively to one another. The pin may be unlocked by a key axially inserted into the shank through one of the heads.

3 Claims, 4 Drawing Figures

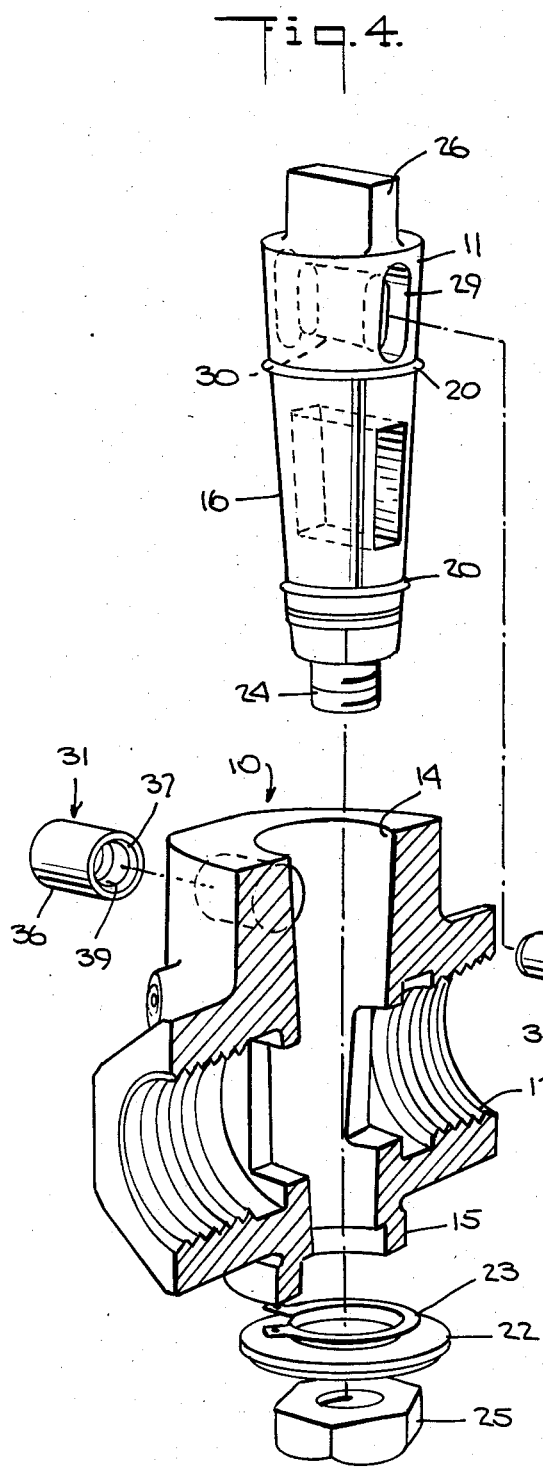
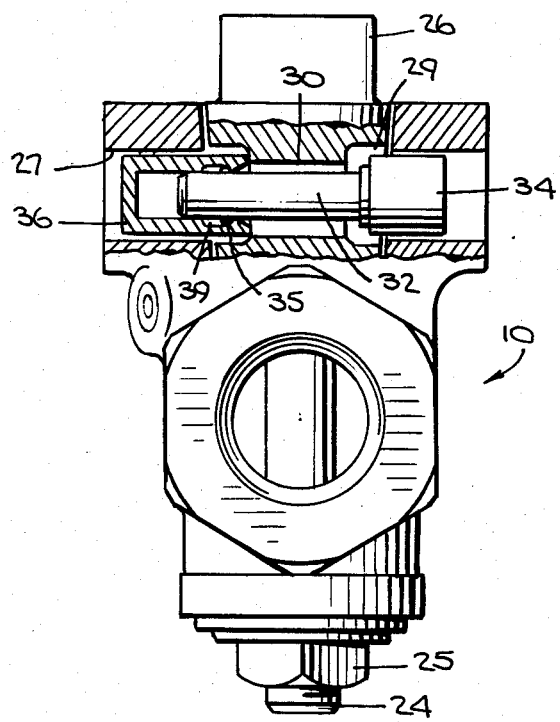

LOCKABLE VALVE

BACKGROUND OF THE INVENTION

1. Field of the Invention

This invention relates to a rotary plug valve and, more particularly, to such a valve which may be locked in a predetermined position. Valves of the class here contemplated find application in gas service lines, for example, to enable gas service to be shut off by locking the valve in its closed position.

2. Description of the Prior Art

It is known from U.S. Pat. No. 3,554,218 to provide a rotary plug valve with a body member having a passage for the flow of fluid therethrough which passage is intersected by a plug seat and a ported valve plug member rotatable in the plug seat between open and closed positions and having an end portion terminating flush with or below the exterior of the valve body member. The end portion of the valve plug member is provided with an axially extending, non-circular socket for receiving an operating head handle member having a non-circular end portion complementary with the socket. The valve body is also provided with a skirt-like extension which surrounds the open end of the plug seat as well as the end portion of the plug member. Suitable bores are provided in the plug member and in the skirt-like extension and these are arranged to be aligned in a selected position of the plug member, preferably the closed position, and into which an elongated plunger-type lock member may be inserted and locked, the handle member having been previously removed. A closure plug is adapted to fit into the socket in the end portion of the valve plug member to protect the end portion of the valve plug member when the valve is locked, the closure member having a bore therethrough arranged to be aligned with the bores in the skirt-like extension of the valve body member and the end portion of the valve plug member so that the closure plug is retained in position by the lock member.

More specifically, and as seen in FIG. 2 of U.S. Pat. No. 3,554,218, the bore in the skirt-like extension of the valve body passes through diametrically opposed portions of the extension as at 40, 40, the bore 44 in the plug member passes through diametrically opposed portions of the plug member defining the socket, the bore in one of the opposed portions of the plug member being of a diameter equal to that of the bore in the skirt-like portion of the valve body while the bore in the other opposed portion of the plug member is of a reduced diameter, as at 45. The bore in the closure plug is actually constituted by a bore 64 and a counterbore 66, the bore 64 being of a diameter equal to that of the bore in the valve body and the counterbore being equal to the bore 45 of reduced diameter in the skirt-like extension.

A conventional elongated locking device 46 is used to secure a valve as described above in closed position. The locking device 46 has an enlarged head 48 and a shank 50 of reduced diameter, the shank carrying a pair of steel balls 52 held in an outwardly extended position by an unshown mechanism in the device 46. A second enlarged head 54 is cup-shaped to receive the shank 50 and has an inner annular groove 56 to receive the balls 52 when the mechanism in the device prevents the balls from moving radially inwardly thus locking the two elements of the device 46 together until a special key is inserted axially through one of the heads to move the mechanism in the device to allow the balls to retract from the groove 56.

It is noted that a portion of the bore 44 is reduced so that the heads of the locking device prevent the device from moving axially when in locked position.

According to this construction then, a skirt-like extension on the body member is used to provide an interface between the valve plug and a removable handle 36 for operating the valve, and between the valve plug and a closure plug 38 that replaces the handle when the valve is to be locked. Thus, a multiplicity of parts are required and since all of the parts are not used at the same time, those not in use are subject to loss and of course extra parts add to overall cost. Moreover, the need to exchange parts when unlocking the valve and to reverse exchange parts when relocking it is cumbersome.

Additionally, since it is desired that no part of the locking device extend beyond the perimeter of the valve body, it is possible to insert the locking device into the valve of U.S. Pat. No. 3,554,218 in one direction only thus rendering its application inconvenient and requiring the entry side of the valve to be clear of adjacent structures. Further, various configurations of the prior device require it to be machined for sufficiently precise fit and this is costly.

It should also be noted that a gas company using these prior art valves would have to equip their personnel with the special handle required to operate the valve; fire and police department personnel would also need such handles to be able to control gas flow in an emergency; plumbers required to do routine maintenance on gas appliances would need the handles; and each customer in certain states are required by law to have a tool on hand to shut off gas in case of earthquake.

It is also known from U.S. Pat. No. 3,560,130 to provide locking means on a valve member and a valve body adapted to prevent movement of the valve member when the same is in a selected position relative to the valve body. To this end, a bore is formed through the valve member perpendicular to its axis while a bore is formed to extend through the valve body at opposite diametral points and in axial alignment with the valve member bore when in a selected position. One end of the bore in the valve body is blind so that a known locking pin such as a pin of the Smith-Morse type having an enlarged head at one end and a reduced shank extending therefrom can be inserted through the aligned bores to lock the valve body and valve member against relative rotation from a selected position. The open bore portion in the valve body receives the head of the locking pin, being of a diameter to accomodate the head, the blind bore and bore in the valve member being of smaller diameter to receive only the locking pin shank.

The locking pin has projecting balls similar in function to those of the locking device previously described, but in this case the balls engage in an annular groove in a cap fixed in the blind portion of the valve body bore, in which case the blind part of the bore is of a larger diameter to accomodate the cap, or the balls may engage in an annular groove in the bore that extends through the valve member.

In the arrangement shown in the embodiments of U.S. Pat. No. 3,560,130 wherein the balls of the locking pin engage in an annular groove in the bore extending through the valve member, the valve member and the valve body must be aligned in one angular position only in order properly to lock the device i.e., a position wherein the balls enter the annular groove when the lock pin head has fully entered the open bore in the valve body. If the bores are aligned with the valve member 180° away from that position, the balls will enter the groove to lock the valve while the locking pin head projects from the body and could readily be attacked.

Additionally, in respect of the prior construction, a certain amount of machining is required to form the blind bore for the cap, if one is used, or to receive the shank of the locking pin. Based upon the size of the valve, other areas of those elements relating to the locking feature may also have to be machined.

It is also noted that the device disclosed in U.S. Pat. No. 3,560,130 is specifically designed to accept only a locking pin of the Smith-Morse type.

SUMMARY OF THE INVENTION

I have conceived and contribute by the present invention a lockable rotary plug valve of the class described by which I am able to overcome the foregoing difficulties and disadvantages by means of a simple and inexpensive structure.

For attaining the objectives mentioned above and later to be expressed, an important aspect of my invention resides in the provision of a rotary plug valve capable of being locked in selected positions by an elongated locking pin having a first enlarged head on a reduced shank and a second enlarged cap-shaped head arranged to receive and be locked to the shank and released from the shank by a key axially inserted into the shank.

The rotary valve includes a body having a seat and provided with a flow passageway therethrough intercepted by the seat, and a valve member having a flow passage therethrough and being rotatable in the seat between a selected open position in which its flow passage registers with the flow passageway in the body, and a selected closed position in which its flow passage does not register with the flow passageway in the body.

The body is formed with means defining a transverse bore therethrough preferably in an end position remote from the flow passageway, and of a diameter to receive the heads of the locking pin.

The valve member or plug is provided with means defininng a tranverse bore arranged to be aligned with the bore in the body when the valve member is in a selected position for locking the valve member against movement relative to the valve body. This transverse bore in the valve member has a central portion of a diameter less than the diameter of the heads of the locking pin but sufficient to receive the shank thereof. I prefer that the valve member be formed so as to have a solid uninterrupted end portion extending from its transverse bore at least to the distal end of the end portion of the body.

The bores are constructed and arranged so that the heads of the locking pin do not extend beyond the exterior of the valve body when the valve is locked.

According to another aspect of the invention, the means defining the transverse bore in the valve member is enlarged at its ends to a minimum size at least equal to the diameter of the bore in the valve body so as to receive a portion of the respective heads of the locking pin.

I also provide an upstanding non-circular projection on the distal end of the end portion of the valve member for a purpose later to be described.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

DESCRIPTION OF THE DRAWINGS

Specific embodiments of the invention have been chosen for purposes of illustration and description, and are shown in the accompanying drawings, forming a part of the specification wherein:

FIG. 3 is an end view of the valve of FIGS. 1 and 2, partly in section and illustrating the locking pin in valve locking position; and FIG. 4 is an exploded view, partly broken away, and illustrating the relationship of its valve parts and the locking pin.

DESCRIPTION OF PREFERRED EMBODIMENT

Figure 1:
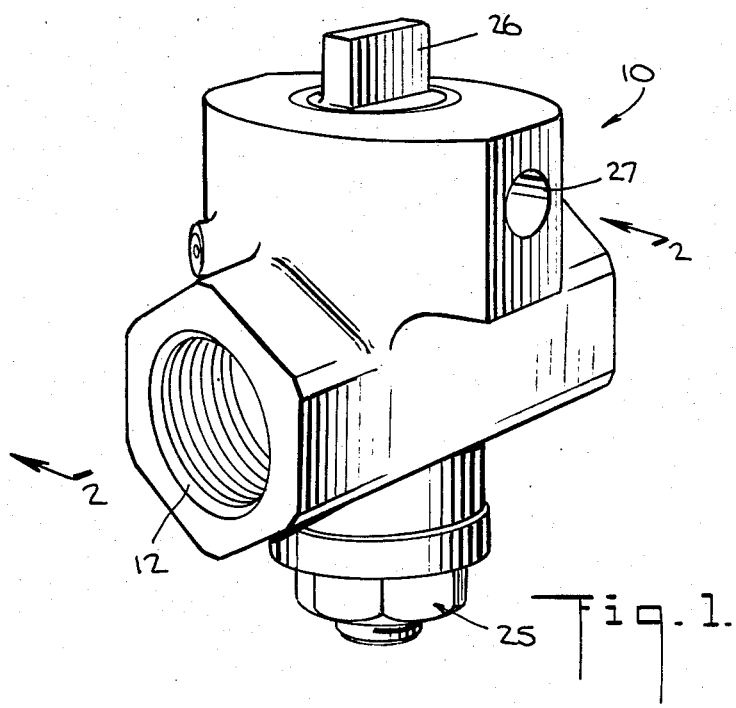
FIG. 1 is perspective view illustrating the valve of the present invention.

Referring now to the drawing, it will be seen that the valve of the present invention includes a valve body 10 and a valve member 11. The valve body 10 is formed with a flow passageway 12 extending therethrough, the outer ends of which passageway are threaded for connection with ends of sections of piping.

Figure 2:
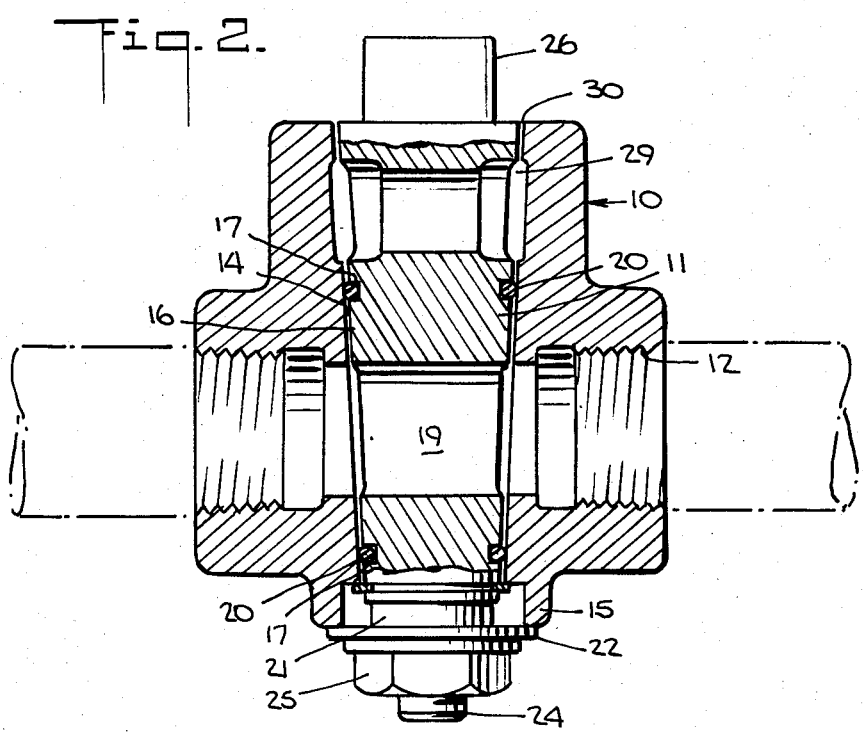
FIG. 2 is a sectional view taken along the line 2—2 of FIG. 1.

The valve body is also formed with an elongate seat 14 extending therethrough and orthogonal with respect to the flow passageway 12, the seat being tapered, as shown, and with an annular rib 15 (FIGS. 2 and 4) depending from its lower end, as viewed, for a purpose later to be described.

The valve member 11 has a tapered portion 16 adapted to mate with the seat 14 of the valve body 10, and has a pair of circumferential grooves 17 (FIG. 2), one on each side of a flow passage 19 extending laterally through the valve member to register with the flow passageway 12 in the valve body when the valve is open thus to allow the flow of fluid, such as gas, through the valve. An O-ring seal 20 is positioned in each groove 17 to prevent fluid from leaking through the interface between the seat 14 and the valve member 11.

The valve member has a reduced section 21 at its lower end, as viewed, for reception of a suitably formed washer 22 and a snap ring 23, and a second reduced section 24 that is threaded to receive a nut 25 that retains the washer against the depending rib 15 of the valve body.

The upper end of the valve member, as viewed has an upstanding non-circular projection 26 for reception of a tool to rotate the valve member about its longitudinal axis relative to the valve body to open and close the valve.

From the description thus far, it will be seen that the valve member, seated in the valve body cannot be withdrawn upwardly therefrom because of the engagement of the washer 22 and the rib 15 as secured by the nut 25, nor can it be withdrawn downwardly because of the mating relationship of the seat 14 and the tapered portion 16 of the valve member.

However, the valve member can be rotated about its vertical axis, by means of the projection 26 to open and close the flow passageway 12. If desired, suitable lugs can be formed and spaced annularly 90° apart from each other, on top of the valve member to interfere with rotation of the projection 26 so as to limit rotation of the valve member between an open position and a closed position.

As shown in FIGS. 1 and 3, the valve body is also formed with a circular, through bore 27, cast in the body and transverse to the axis of the seat 14 and which I prefer to locate at a position above the flow passageway 19 and above the uppermost O-ring 20 when the valve member is in place.

The valve member is also formed witn a transverse, through bore 29, cast in that member and positioned to register with the bore 27, and having a reduced central portion as at 30. The bore 29, including the portion 30 thereof, is preferably oval shaped with its major axis parallel to the longitudinal axis of the valve member, for a purpose later to be described.

The bores 27 and 29 are arranged, relative to the flow passage 19 in the valve member, so that when they are in register, the valve member is in closed position, that is, the passage 19 is not in register with the passageway 12 of the valve body.

FIGS. 3 and 4 show a known locking pin 31 commercially available from Brooks Co. of Newark, N.J. This device includes a shank 32 having an enlarged head 34 at one end and a pair of steel balls 35 biased outwardly through openings in the shank by internal means (not shown). A separate, second head 36 is recessed as at 37 to receive the free end of the shank 32. The recess has an annular groove 39 to receive the balls 35 thus securing the head 36 to the shank. A special key may be inserted axially into the locking pin through one of its heads to relieve the bias on the balls 35 allowing them to retract to unlock the head 36 from the shank.

As will be understood from the foregoing description, when its valve is open to the flow of fluid therethrough, the bore 29 in the valve member does not register with the bore 27 in the valve body, but when the valve member is rotated 90° through the agency of the projection 26, the passage 19 come out of registry with the passageway 12, thus closing the valve, and the bores 27 and 29 are brought into registry and may receive the locking pin 31.

To lock the valve in closed position the shank 32 of the locking pin 31 is passed through one side of the bore 27 in the valve body and through the bore 29 including its reduced center portion 30 in the valve member and into the opposite side of the bore 27 where the second head 36 is made to engage the free end of the shank until the balls 35 seat in the annular groove 39 in the recess 37 of the second head.

It will be seen from FIG. 3 that while the bore 27 in the valve body is large enough to receive either head of the locking pin and the ends of the bore 29 in the valve member are sized to receive a portion of either head, the central portion 30 of the bore 29 is of a size only large enough to receive the reduced shank 32 but is too small to receive any portion of either head. Accordingly, the locking pin shank may be inserted from either side of the valve body, the second head 36 being applied to the free end of the shank 32 which then extends through the central portion 30, the other end of the bore 29 of the valve member and into the portion of the bore 27 of the valve body opposite the entry portion.

As shown, the valve body is so constructed that each portion of the bore 27 is deep enough to receive either head 34 or 36 in its entirety thus to prevent the application of transverse forces thereto in an effort to break the locking pin and, because the heads 34 and 36 are larger than the central position 30 of the bore 29, the locking pin may not be axially removed from the valve while in locked condition. It will be appreciated that the valve could be constructed so as to be locked in open position by repositioning the bore 27 in the valve body so that its axis is 90° to that of the bore 27 as here shown and described and in a plane perpendicular to the longitudinal axis of the valve member, or two sets of bores, positioned 90° apart could be provided in the valve body to permit locking in either open or closed position.

To defeat efforts to force the valve in rotation, when locked, the upstanding projection 26 on the valve member is made to rupture under torsional stress before any other part of the valve or the locking pin will fail thus assuring the integrity of the valve and providing a visual indication of a tampering effort.

As mentioned above, the bore 29 in the valve member is of oval configuration. This assures free movement of the locking pin parts into and out of the valve body and valve member when locking and unlocking the valve by providing compensation for the high manufacturing tolerances of the parts of the valve.

I believe that the construction and operation of my novel lockable rotary plug valve will now be understood and that the several advantages thereof will be fully appreciated by those persons skilled in the art.

I claim:

1. A rotary plug valve capable of being locked in selected positions by an elongated locking pin having a first enlarged head on a reduced shank and a second separate enlarged cup-shaped head arranged to receive and be locked to the shank and released from the shank by a key axially inserted into the shank, said rotary valve comprising:

a body having a seat and provided with a flow passageway therethrough intercepted by said seat;

a valve member having a flow passage therethrough and being rotatable in said seat between a selected open position in which its flow passage registers with the flow passageway in said body and a selected closed position in which its flow passage does not register with the flow passageway in said body;

said body being formed with means defining a transverse bore therethrough of a diameter to receive the heads of the locking pin;

said valve member being provided with means defining a transverse bore arranged to be aligned with said bore in said body when said valve member is in a selected position for locking said valve member against movement relative to said valve body, said transverse bore in said valve member having a central portion of a diameter less than the diameter of the heads of the locking pin but sufficient to receive the shank thereof, and being enlarged at its ends to a diameter substantially equal to the diameter of said bore in said valve body so that a portion of each of the heads of the locking pin extends into a respective enlarged portion of said transverse bore in said valve member;

said bores being constructed and arranged so that the heads of the locking pin do not extend beyond the exterior of said valve body when the valve is locked.

2. A rotary plug valve according to claim 1 wherein said valve body is provided with means defining a second transverse bore therethroguh similar to the first bore therethrough but the axis of which is spaced annularly 90° from the axis of the first mentioned bore therethrough and in a plane perpendicular to the longitudinal axis of the valve member.

3. A rotary plug valve according to claim 1, wherein the bores are constructed and arranged so that the locking pin may be locked after inserting the reduced shank into either end of the transverse bore through said valve body and without either head extending beyond the exterior of said valve body.

* * * * *